United States Patent [19]

Nogi et al.

[11] Patent Number: 4,731,723
[45] Date of Patent: Mar. 15, 1988

[54] POWER SUPPLY INSTALLATION FOR DC ELECTRIC RAILROAD

[75] Inventors: Teiji Nogi, Tokyo; Toyomi Gondo; Tuneo Tamura, both of Kanagawa; Hiroyasu Sato, Miyagi, all of Japan

[73] Assignee: Kabushiki Kaisha Meidensha, Tokyo, Japan

[21] Appl. No.: 883,998

[22] Filed: Jul. 10, 1986

[30] Foreign Application Priority Data

Jul. 12, 1985 [JP] Japan .................................. 60-153698
Jul. 18, 1985 [JP] Japan .................................. 60-158699
Jul. 18, 1985 [JP] Japan .................................. 60-158705

[51] Int. Cl.$^4$ .......................................... H02M 7/155
[52] U.S. Cl. ......................................... 363/70; 363/128; 361/100
[58] Field of Search .................. 361/62, 63, 100; 363/53, 54, 69, 70, 84, 128, 129

[56] References Cited

U.S. PATENT DOCUMENTS

| | | | |
|---|---|---|---|
| 3,633,071 | 1/1972 | Fendt et al. | 361/63 |
| 4,386,299 | 5/1983 | Pham | 318/261 |
| 4,480,298 | 10/1984 | Fry | 363/128 X |
| 4,600,982 | 7/1986 | Graham | 363/128 X |

OTHER PUBLICATIONS

Meidensha Electric Mfg. Co., Ltd., "MEIDEN Static Type Feeding System", 1984.

Primary Examiner—Patrick R. Salce
Assistant Examiner—Marc S. Hoff
Attorney, Agent, or Firm—Bachman & LaPointe

[57] ABSTRACT

The power supply installation for a direct current railroad comprises two diode bridge-connected circuits, only two thyristor breakers each connected in parallel to each of the two diode bridge-connected circuits, four dc disconnecting switches each connected between a diode bridge-connected circuit and one of four electric car power supply lines constituting a double track, separately. Further, the two diode bridge-connected circuits are connected by a dc disconnecting switch closed only in case of an accident. In case a ground fault occurs at a power supply line, a powering current to the defective line is interrupted by one of the breakers, together with an extension power supply current supplied from an adjacent substation, without exerting an influence of accident upon the other power supply lines. Further, even if one of the breakers is broken, powering currents are kept supplied to all the power supply lines through a mutual spare bus bar.

4 Claims, 4 Drawing Figures

POWER SUPPLY INSTALLATION FOR DC ELECTRIC RAILROAD

BACKGROUND OF THE INVENTION

1. Field of the Invention

The present invention relates generally to a power supply installation for a direct current (dc) electric railroad and more specifically to a power supply installation by which an alternating current (ac) power is converted into a dc current power before being supplied to electric cars as a powering source.

2. Description of the Prior Art

Usually, a plurality of dc substations are installed at appropriate intervals along a railroad track. In these dc substations, a plurality of converters are arranged. The dc power output side of the converter is connected to each electric car power supply lines through each semiconductor breaker and the ac power input side thereof is directly connected in common with a power conductor. In other words, plural power supply circuits having power rectifiers and high-speed dc breakers are connected in parallel with each other between substations so as to construct a dc power supply installation.

On the other hand, the electric car power supply lines are divided into plural sections, and each of the above divided electric car power supply lines is connected to a positive bus bar through a high-speed breaker provided for each electric car power supply line and the electric car rails are connected to a negative bus bar at each substation.

In the prior art power supply installation for a dc railroad, however, there exist various drawbacks as follows: (1) In case the power rectifier fails in commutation, the influence of an accident due to the commutation failure tends to spread. (2) Once the regenerative breaker is turned off, the power is suspended for all the adjacent power supply lines. (3) The interruption capacity of the regenerative breaker should be great because the regenerative current and plural extension power supply current should be interrupted. (4) To reduce the interruption capacity of the regenerative breaker, it is necessary to interrupt the extension powering current at the adjacent substation. This operation complicates the operation sequence against accident and therefore lowers the reliability of the installation. (5) In the case of a double track, since four powering breakers should be provided, the installation is costly.

The arrangement of the prior art power supply installation for a direct current railroad will be described in further detail hereinafter with reference to FIG. 1 under Detailed Description of the Preferred Embodiments.

SUMMARY OF THE INVENTION

With these problems in mind, therefore, it is the primary object of the present invention to provide a novel power supply installation for a direct current railroad which can prevent the harmful influence of an accident or trouble from being exerted upon other sections of the installation or upon the adjacent substation in order to keep the service of electric cars as widely as possible while reducing the cost of the power supply installation.

To achieve the above-mentioned object, the power supply installation for a direct current railroad according to the present invention for supplying a direct current power to at least two first and second electric car power supply lines (in a single track) arranged in series via a dead section comprises: (a) a power rectifier for converting an alternating current power to a direct current power in powering operation; (b) a first diode bridge-connected circuit having common-connected cathodes connected to said power rectifier; (c) a first breaker connected between the common-connected cathodes and common-connected anodes of the first diode bridge-connected circuit, for simultaneously controlling a connection and a disconnection of a powering current supplied from said power rectifier to the two electric car power supply lines and a regenerative current supplied from one of the two power supply lines to the other thereof; (d) a first dc disconnecting switch connected between a first intermediate point of said first diode bridge-connected circuit and the first electric car power supply line, for disconnecting a powering current from said power rectifier in case an accident occurs at the first power supply line; and (e) a second dc disconnecting switch connected between a second intermediate point of said first diode bridge-connected circuit and the second electric car power supply line, for disconnecting a powering current from said power rectifier in case an accident occurs at the second power supply line.

In the case of a double track, the power supply installation according to the present invention further comprises: (a) a second diode bridge-connected circuit having common-connected cathodes connected to said power rectifier in parallel with said first diode bridge-connected circuit; (b) a second breaker connected between the common-connected cathodes and common-connected anodes of said second diode bridge-connected circuit, for simultaneously controlling connection and disconnection of a powering current supplied from said power rectifier to a third and fourth electric car power supply lines arranged in series via a dead section and in parallel with the first and second power supply lines, respectively, and a regenerative current supplied from one of the third and fourth power supply lines to the other power supply lines; (c) a third dc disconnecting switch connected between a first intermediate point of said second diode bridge-connected circuit and the third electric car power supply line, for disconnecting a powering current from said power rectifier in case an accident occurs at the third power supply line; (d) a fourth dc disconnecting switch connected between a second intermediate point of said second diode bridge-connected circuit and the fourth electric car power supply line, for disconnecting a powering current from said power rectifier in case an accident occurs at the fourth power supply line; and (e) a fifth dc disconnecting switch connected between common-connected anodes of said first diode bridge-connected circuit and common-connected anodes of said second diode bridge-connected circuit, said fifth dc disconnecting switch being usually opened but closed only when either one of said first and second breakers is defective.

In this first embodiment for a single track, a regenerative current generated at an electric car power supply line can be restored to the other electric car power supply lines.

In the above installation, in case either one of the breakers is broken down, the fifth dc disconnecting switch is closed in the mutual spare bus bar to connect the two diode bridge-connected circuits. Therefore, it is possible to keep the power supply to all the electric car power supply line.

In case a ground fault occurs at an electric car power supply line, only the dc disconnecting switch connected to the ground fault power supply line is opened. Therefore, it is possible to keep the power supply to the other power supply lines except the ground fault line. In this case, the extension powering current supplied from the adjacent substation can also be interrupted by the opened dc disconnecting switch.

In the case where only one track is required to be power-suspended, only the thyristor breaker connected to the track is opened with the other thyristor breaker is kept closed. Therefore, it is possible to supply an extension powering current only to the other track without supplying an extension powering current to the power-suspended track.

Further, in case an accident occurs during an extension power supply operation, only the thyristor breaker connected to a defective electric car power supply line is opened. In this case, since the extension powering current is interrupted simultaneously, it is unnecessary to interrupt the extension powering current at the adjacent substation.

In the second embodiment of the present invention, two stopper diodes and two dc disconnecting switches connected in parallel to the two stopper diodes are connected between the two diode bridge-connected circuits and the mutual spare bus bar, respectively. Therefore, a regenerative current generated at an electric car power supply line can also be restored to the power supply bus bar through a power inverter.

In the third embodiment of the present invention, a diode series-connected circuit is connected between the powering bus bar and the regenerative bus bar, and a two-way power converter is connected to the diode series-connected circuit, in order to further enhance the reliability of the installation.

BRIEF DESCRIPTION OF THE DRAWINGS

The features and advantages of the power supply installation for a dc railroad according to the present invention over the prior art power supply installation will be more clearly appreciated from the following description of the preferred embodiment of the invention taken in conjunction with the accompanying drawings in which like reference numerals designate the same or similar elements or sections and in which.

DETAILED DESCRIPTION OF THE PREFERRED EMBODIMENT

To facilitate understanding of the present invention, a brief reference will be made to a prior art power supply installation for a dc electric railroad with reference to the attached drawing.

Figure 1:
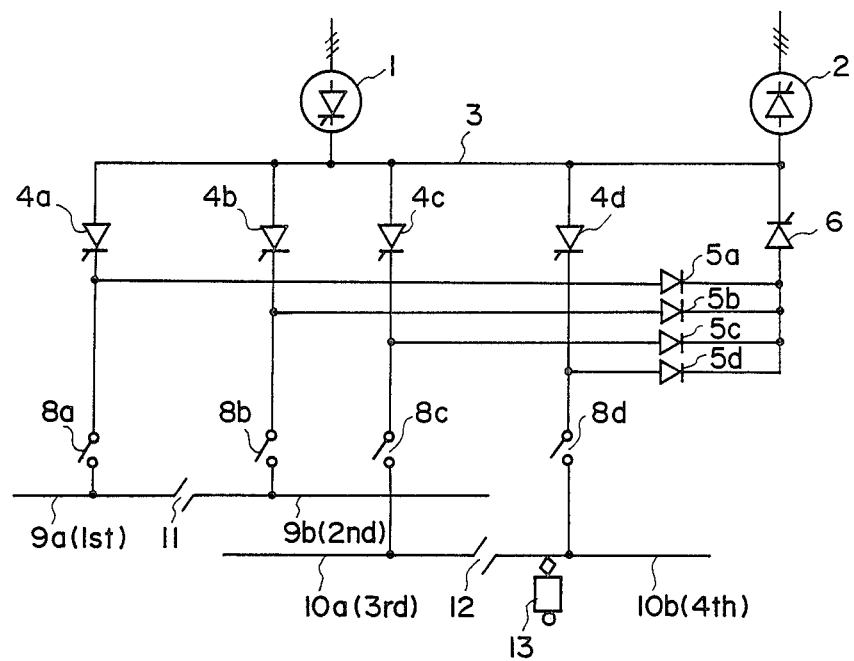
FIG. 1 is a schematic block diagram of the prior art power supply installation for a dc railroad.

FIG. 1 shows a prior art power supply installation for a double-track railroad installed in each substation. In the drawing, the reference numeral 1 denotes a power rectifier made up of plural thyristors for converting an ac power to a dc power; the reference numeral 2 denotes a power inverter made up of plural thyristors for converting a dc power to an ac power. The reference numeral 3 denotes a dc bus bar for directly connecting the power rectifier 1 to the power inverter 2. Further, the reference numeral 4a to 4d denote powering thyristor breakers (referred to as powering breakers; the numeral 6 denotes a regenerative thyristor breaker (referred to as a regenerative breaker); the numerals 5a to 5d denote regenerative diodes. The anodes of these regenerative diodes 5a to 5d are connected to the cathode of each of the powering breakers 4a to 4d separately, and the cathodes of these regenerative diodes 5a to 5d are connected together to the anode of the regenerative breaker 6. Further, the cathode of the regenerative breaker 6 is connected to the dc bus bar 3 which connects the power rectifier 1 to the power inverter 2. The reference numeral 8a to 8d denote dc disconnecting switches; the numerals 9a to 9b denote first and second electric car power supply lines and the numeral 10a and 10b denote third and fourth electric car power supply lines. The first and second electric car power supply lines 9a and 9b are separated from each other by a first dead section 11 and the third and fourth electric car power supply lines 10a and 10b are separated from each other by a second dead section 12 (the above-mentioned dead sections imply sections through which no current flows). The first and the third power supply lines 9a and 10a are provided for a double track railraod within one section, while the second and fourth power supply lines 9b and 10b are provided for the double track railroad within the other adjoining section.

Therefore, power is simultaneously supplied to each electric car power supply line from both the substation and the adjacent substation (not shown). Further, power is supplied to one electric car power supply line (e.g. 9a) from the other electric power supply line (e.g. 10b) through the power supply installation (e.g. the dc disconnecting switch 8d, the regenerative diode 5d, the regenerative breaker 6, dc bus bar 3, the powering breaker 4a, and the dc disconnecting switch 8a,) in case the power rectifier 1 is defective. The above power supplying system is referred to as an extension power supply system.

The prior art installation shown in FIG. 1 operates as follows: In order to supply an electric car driving power to electric cars, a three-phase ac voltage received from a commercial frequency 3-phase ac transmission line (not shown) through an ac circuit breaker (not shown) is dropped to an appropriate voltage through a transformer (not shown) arranged in the substation, converted into a dc power through the power rectifier 1, and then supplied to an electric car 13 running on the fourth electric car power supply line 10b, for instance, through the powering breaker 4d and the dc disconnecting switch 8d.

When an electric car 13, for instance, is in regenerative braking operation, the regenerative power is restored from the fourth electric car power supply line 10b to the dc bus bar 3 through the dc disconnecting switch 8d, the regenerative diode 5d and the regenerative breaker 6. The restored regenerative power of the dc bus bar 3 is supplied to a powering electric car (not shown) running on any one of the power supply lines 9a, 9b and 10a or to the power supply bus bar through the power inverter 2.

The above-mentioned prior art power supply installation for a dc railroad involves various problems as follows:

(1) Since the power rectifier 1 and the power inverter 2 are directly connected to each other by the dc bus bar 3 in reverse parallel relationship, in case the power inverter 2 fails in commutation, a large accident current flows from the power rectifier 1 to the power supply bus bar through the power inverter 2, thus there exists a problem in that an accident due to commutation failure of the power inverter 2 spreads wider.

(2) In the case where only the disconnecting switch 8a is required to open for maintenance, for instance, this disconnecting switch 8a should be opened after the powering breaker 4a has been turned off for safety. Further, when an electric car in regenerative braking operation is running on the first electric car power supply line 9a, the regenerative breaker 6 should also be turned off before opening the dc disconnecting switch 8a. Once the regenerative breaker 6 is opened, the following problems arise.

(a) Since the regenerative current cannot be restored through the regenerative breaker 6 and further the extension powering currents are all interrupted, even when power suspension is required for a desired power supply section, the power supply to the other adjoining electric car power supply lines should be suspended simultaneously, so that many electric cars are tied up.

(b) In case of an accident, when only the regenerative breaker 6 is used for interrupting regenerative currents and extension power supply currents supplied from the other adjacent substations, the interruption capability of the regenerative breaker 6 should at least be four times greater than that of the powering breaker 4a, 4b, 4c or 4d in the case of the four power supply lines (a double track).

(c) In order to reduce the interruption capacity of the regenerative breaker 6 to such a small extent as to be able to interrupt only the regenerative current, it is impossible to interrupt the extension power supply currents by the regenerative breaker 6 when a regenerative car is running on any of the four power supply lines during an accident. Therefore, it is necessary to interrupt an extension current flowing to an accident point at the adjacent substation, so that the operation sequence against an accident is complicated and the reliability of the system is thus deteriorated.

(d) In the case of the double track, since four powering breakers 4a to 4d are necessary, the substation is costly.

In view of the above description, reference is now made to embodiments of the power supply installation for a dc railroad according to the present invention applied to a double-track railroad, by way of example, with reference to the attached drawings.

In the drawings, the same reference numerals have been retained for similar parts or sections which have the same functions as is the case with the prior art installation previously described with reference to FIG. 1, and any detailed description of them is believed to be unnecessary.

Figure 2:
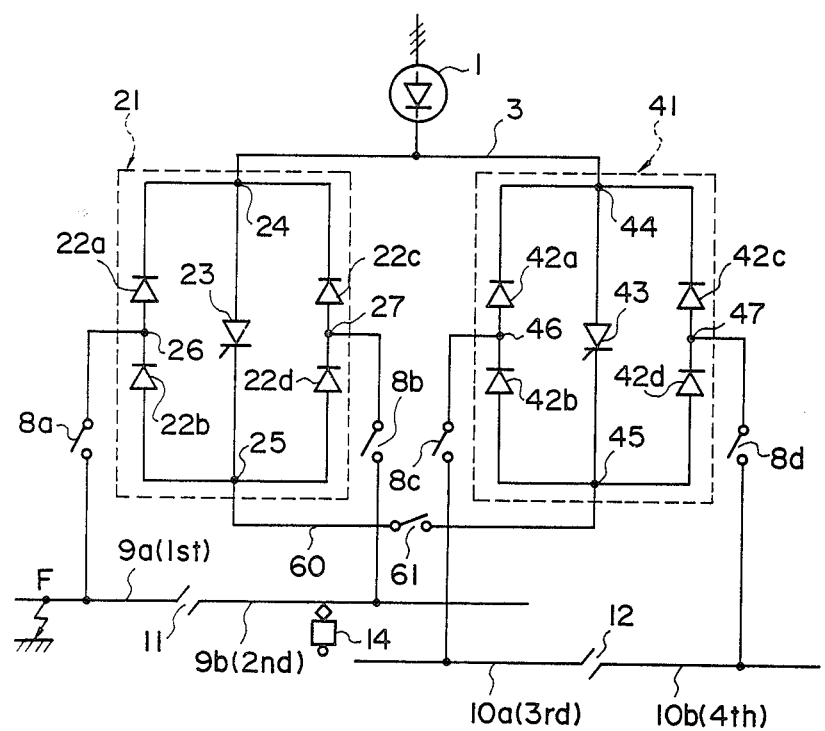
FIG. 2 is a schematic block diagram of the first embodiment of the power supply installation for a dc railroad according to the present invention.

FIG. 2 shows the first embodiment of the present invention, in which regenerative current is restored to only the electric car power supply lines. Being different from the prior art installation shown in FIG. 1, the installation comprises two diode bridge-connected circuits 21 and 41. The first diode bridge-connected circuit 21 includes a first pair of diodes 22a and 22b connected in series to each other and a second pair of diodes 22c and 22d connected in series to each other. Similarly, the second diode bridge-connected circuit 41 includes a first pair of two series-connected diodes 42a and 42b and a second pair of two series-connected diodes 42c and 42d.

The anode of the diode 22a is connected to the cathode of the diode 22b and similarly the anode of the diode 22c is connected to the cathode of the diode 22d. The cathodes of the diodes 22a and 22c are connected to a common junction point 24 connected to a powering bus bar 3, and the anodes of the diodes 22b and 22d are connected to another common junction point 25 connected to a mutual spare bus bar 60.

The anode of a first thyristor breaker 23 (or a dc high speed breaker) is connected to the common junction point 24 of the first diode bridge-connected circuit 21, and the cathode of the breaker 23 is connected to the common junction point 25 of the first diode bridge-connected circuit 21.

Further, a junction point 26 of the anode of the diode 22a and the cathode of the diode 22b is connected to a first electric car power supply line 9a through a dc disconnecting switch 8a, while a junction point 27 of the anode of the diode 22c and the cathode of the diode 22d is connected to a second electric car power supply line 9b through a dc disconnecting switch 8b.

The second diode bridge-connected circuit 41 also includes a first pair of diodes 42a and 42b connected in series to each other and a second pair of diodes 42c and 42d connected in series to each other. Further, a second thyristor breaker 43 is connected in the second diode bridge-connected circuit 41. The diodes 42a, 42b, 42c and 42d of the second diode bridge-connected circuit 41 and the second thyristor breaker 43 are connected to each other in quite the same way as in the diodes 22a to 22d and the first breaker 23. Therefore, the description of the connections of these elements are omitted herein. However, a junction point 46 of the anode of the diode 42a and the cathode of the diode 42b is connected to a third electric car power supply line 10a through a dc disconnecting switch 8c; a junction point 47 of the anode of the diode 42c and the cathode of the diode 42d is connected to a fourth electric car power supply line 10b through a dc disconnecting switch 8d.

Further, another dc disconnecting switch 61 is connected midway of the mutual spare line 60 between the two junction points 25 and 45 of the two diode bridge-connected circuits 21 and 41. This dc disconnecting switch 61 is kept open under the normal conditions but closed in case either one of the first and second thyristor breakers 23 and 43 develops trouble. Further, in this embodiment, although the power rectifier 1 is shown by a diode rectifier, it is of course possible to configure the power rectifier 1 by plural thyristors.

The operation of the first embodiment will be described hereinbelow. Under the normal conditions, the two thyristor breakers 23 and 43 and the four dc disconnecting switches 8a to 8d are all kept closed, and the dc disconnecting switch 61 is kept open. Therefore, a powering current of the power rectifier 1 is supplied to the first electric car power supply line 9a by way of the first thyristor breaker 23, the diode 22b and the dc disconnecting switch 8a and simultaneously to the second electric car power supply line 9b by way of the same first thyristor breaker 23, the diode 22d and the dc disconnecting switch 8b, that is, through the first thyristor breaker 23 and the first diode bridge-connected circuit 21. Similarly, a powering current of the power rectifier 1 is supplied to the third electric car power supply line 10a by way of the second thyristor breaker 43, the diode 42b, and dc disconnecting switch 8c and to the fourth electric car power supply line 10b by way of the second thyristor breaker 43, the diode 42d and the dc disconnecting switch 8d, that is, through the second thyristor breaker 43 and the second diode bridge-connected circuit 41.

Further, a regenerative current generated by an electric car running on the first electric car power supply line 9a is restored to the second power supply line 9b by way of the dc disconnecting switch 8a, the diode 22a, the first thyristor breaker 23, the diode 22d, and the dc disconnecting switch 8b, to the third power supply line 10a by way of the dc disconnecting switch 8a, the diode 22a, the powering bus bar 3, the second thyristor breaker 43, the diode 42b, and the dc disconnecting switch 8c, or to the fourth power supply line 10b by way of the dc disconnecting switch 8a, the diode 22a, the powering bus bar 3, the second thyristor breaker 43, the diode 42d, and the dc disconnecting switch 8d.

In the same way, a regenerative current generated at the second, third, and fourth power supply lines 9b, 10a, and 10b is supplied to the other power supply lines through either of the first and second thyristor breakers 23 and 43 and either of the first and second diode bridge circuits 21 and 41.

In the above-mentioned operation, it should be noted that only two powering breakers 23 and 43 control both the powering current and regenerative current supplied to or from the four electric car power supply lines 9a, 9b, 10a and 10b. In the case of the prior art installation shown in FIG. 1, four powering breakers 4a to 4d are connected to supply powering currents. Since the thyristor breaker is high costly, it is possible to reduce the cost of the installation in the present embodiment. Further, since the powering current and the regenerative current both flow through the first and second thyristor breakers 23 and 43, it is possible to interrupt both the powering and regenerative currents simultaneously by opening only the breakers 23 and 43. This simplifies the operation sequence for maintenance or repair in case of an accident.

For instance, in case a ground fault occurs at point F on the first electric car power supply line 9a, the powering current is interrupted by opening the first thyristor breaker 23. Consecutively, the dc disconnecting switch 8a is opened and then the first thyristor breaker 23 is closed again. Under these conditions, even when a regenerative electric car 14 is running on the second power supply line 9b, the regenerative current can be restored to the third and fourth power supply lines 10a and 10b through the routes as already described.

Further, in the case where only the single track, (the first and the second electric car power supply lines 9a and 9b) is required to be power-suspended in an extension power supply operation, only the first thyristor breaker 23 is opened with the second thyristor breaker 43 kept closed. In this case, since the extension powering current can be interrupted to the first and second power supply lines 9a and 9b but supplied only to the third and fourth power supply lines 10a and 10b, therefore it is possible to smoothly drive electric cars running on the third and fourth power supply lines 10a and 10b.

Further, in case an accident occurs during an extension power supply operation, only the thyristor breaker 23 or 43 connected to an accident power supply line is opened. In more detail, in case a ground fault occurs at point F of the first power supply line 9a, the first thyristor breaker 23 is opened, so that the powering current is of course interrupted. In this case, although another extension powering current is supplied to the first power supply line 9a from the adjacent substation through the second power supply line 9b, since this extension powering current is blocked by the diodes 22a and 22d, it is possible to interrupt both the powering currents by opening only the first thyristor breaker 23. Therefore, it is unnecessary to interrupt the extension powering current supplied from the adjacent substation to the first power supply line 9a via the second power supply line 9b at the adjacent substation.

This simplies the operation sequence against accident, minimizes the harmful influence of an accident of a power supply line upon the other power supply line, and thus enhances the operation efficiency of the electric cars and the reliability of the system.

Furthermore, in case the first thyristor breaker 23 is broken down, for instance, the dc disconnecting switch 61 connected midway of the mutual spare bus bar 60 is closed. Under these conditions, it is possible to supply the power to the first and second power supply lines 9a and 9b connected to the defective thyristor breaker 23 from the second thyristor breaker 43 through the mutual spare bus bar 60. This enhances the reliability of the system.

Figure 3:
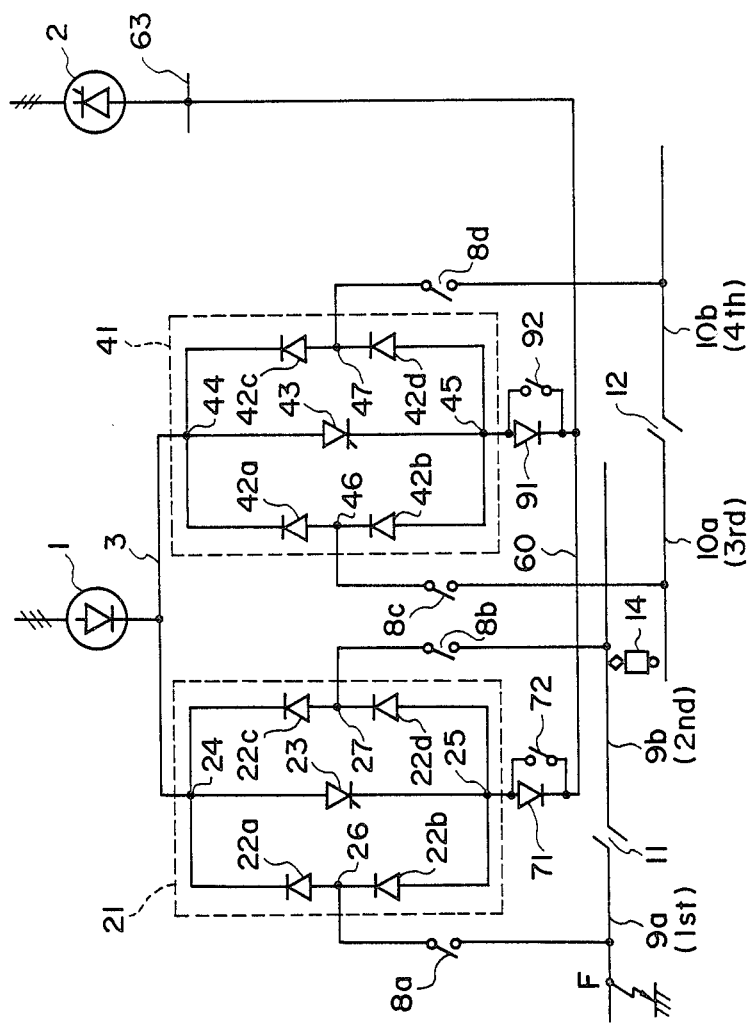
FIG. 3 is a schematic block diagram of the second embodiment of the power supply installation for a dc railroad according to the present invention.

FIG. 3 shows a second embodiment of the present invention, in which two stopper diodes 71 and 91 and a power inverter 2 are further provided in order to restore the regenerative power to a regenerative bus bar and further to the power supply bus bar through a power inverter, in addition to the functions of the installation described with reference to FIG. 2.

In FIG. 3, the reference numerals 71 and 91 denote stopper diodes. The anode of the stopper diode 71 is connected to the common junction point 25 of the first diode bridge-connected circuit 21 and the anode of the stopper diode 91 is connected to the common junction point 45 of the second diode bridge-connected circuit 41. The cathodes of the two stopper diodes 71 and 91 are connected together to the mutual spare bus bar 60. This mutual spare bus bar 60 is connected to a power inverter 2 through a regenerative bus bar 63. The reference numeral 72 and 92 denote two dc disconnecting switches connected in parallel to each of the stopper diodes 71 and 92, separately. These two dc disconnecting switches 72 and 92 are kept open under the normal conditions but closed when either one of the thyristor breaker 23 or 43 develops trouble.

The operation of the second embodiment shown in FIG. 3 will be described hereinbelow. In the same way as in the first embodiment, a powering current is supplied to the first and second power supply lines 9a and 9b through the first thyristor breaker 23, the first diode bridge-connected circuit 21, and the dc disconnecting switch 8a or 8b, and to the third and fourth supply lines 10a and 10b through the second thyristor breaker 43, the second diode bridge-connected circuit 41 and the dc disconnecting switch 8c or 8d.

A regenerative current generated at the first power supply line 9a is supplied to the second power supply line 9b by way of the dc disconnecting switch 8a, the diode 22a, the thyristor breaker 23, the diode 22d, and the dc disconnecting switch 8b, or to the third power supply line 10a by way of the dc disconnecting switch 8a, the diode 22a, the powering bus bar 3, the thyristor breaker 43, the diode 42b, and the dc disconnecting switch 8c, or to the fourth power supply line 10b by way of the dc disconnecting switch 8a, the diode 22a, the powering bus bar 3, the thyristor breaker 43, the diode 42d, and the dc disconnecting switch 8d, or additionally to the regenerative bus bar 63 by way of the dc disconnecting switch 8a, the diode 22a, the first thyristor breaker 23, the stopper diode 71 or the dc disconnecting switch 72 when closed, the mutual spare bus bar 60 or by way of the disconnecting switch 8a, the diode 22a, the powering bus bar 3, the second thyristor breaker 43, and the stopper diode 91 or the dc disconnecting switch 92 when closed, Further, regenerative currents generated at the other second, third, and fourth power supply lines 9b, 10a and 10b are restored to each of the other power supply lines or the regenerative bus bar 63 through the first or second diode bridge-connected circuit 21 or 41 or the stopper diode 71 or 91 or the dc disconnecting switch 72 or 92, respectively.

In this second embodiment, it should be noted that it is possible to eliminate the use of the regenerative breaker 6 required for the prior art installation shown in FIG. 1.

In the same way as in the first embodiment, since the powering current and the regenerative currents flow through the first and second thyristor breakers 23 and 43, respectively it is possible to interrupt the regenerative currents by opening the two breakers 23 and 43 respectively so that the operation sequence for maintenance can be simplified.

Further, in case a ground fault accident occurs at point F of the first power supply line 9a, the first thyristor breaker 23 is opened to interrupt the powering current. Therefore, the dc disconnecting switch 8a is opened and further the first thyristor breaker 23 is closed again. Under these conditions, even if a regenerative electric car 14 is running on the second power supply line 9b, its regenerative current is restored to the regenerative bus bar 63 or the third and fourth power supply lines 10a and 10b through the routes already described. Further, in a ground fault accident at the point F, since the first and second diode bridge-connected circuits 21 and 41 are connected to each other through the two stopper diodes 71 and 91 (when the dc disconnecting switches 30 and 31 are kept open) and the mutual spare bus bar 60, once the first thyristor breaker 23 is opened, an accident current will not flow through the second thyristor breaker 43 to the first power supply line 9a (because the stopper diode 71 is connected in the reverse direction), so that it is possible to prevent the spread of the accident at point F.

In the extension power supply operation such that the first and second diode bridge-connected circuits 21 and 41 and the first and second thyristor breakers 23 and 43 are all operative, if only the first and second power supply lines 9a and 9b are required to be suspended, only the first thyristor breaker 23 is opened. Therefore, it is possible to supply the power to the other third and fourth power supply lines 10a and 10b. Further, in case an accident occurs in the extension power supply operation, it is sufficient to open any one of the thyristor breakers 23 and 43, so that it is unnecessary to interrupt an extension power supply current at the adjacent substation. This simplifies the operation sequence against the accident and minimizes the harmful influence of an accident, and enhances the efficiency of electric car driving operation.

Further, in case either one of the first and second thyristor breakers 23 and 43 is broken down, the dc disconnecting switches 72 and 92 are both closed to mutually supply the power between the first and second diode bridge-connected circuits 21 and 41, because the installation is of mutual spare bus bar type. That is, in case the first thyristor breaker 23 develops trouble, the powering current can be supplied to the first and second power supply lines 9a and 9b by way of the second thyristor breaker 43, the stopper diode 91, the mutual spare bus bar 60, the dc disconnecting switch 72, the diode 22b or 22d and the dc disconnecting switch 8a or 8b. Further, the regenerative current from the first and second power supply lines 9a and 9b can be restored to the regenerative bus bar 63.

Figure 4:
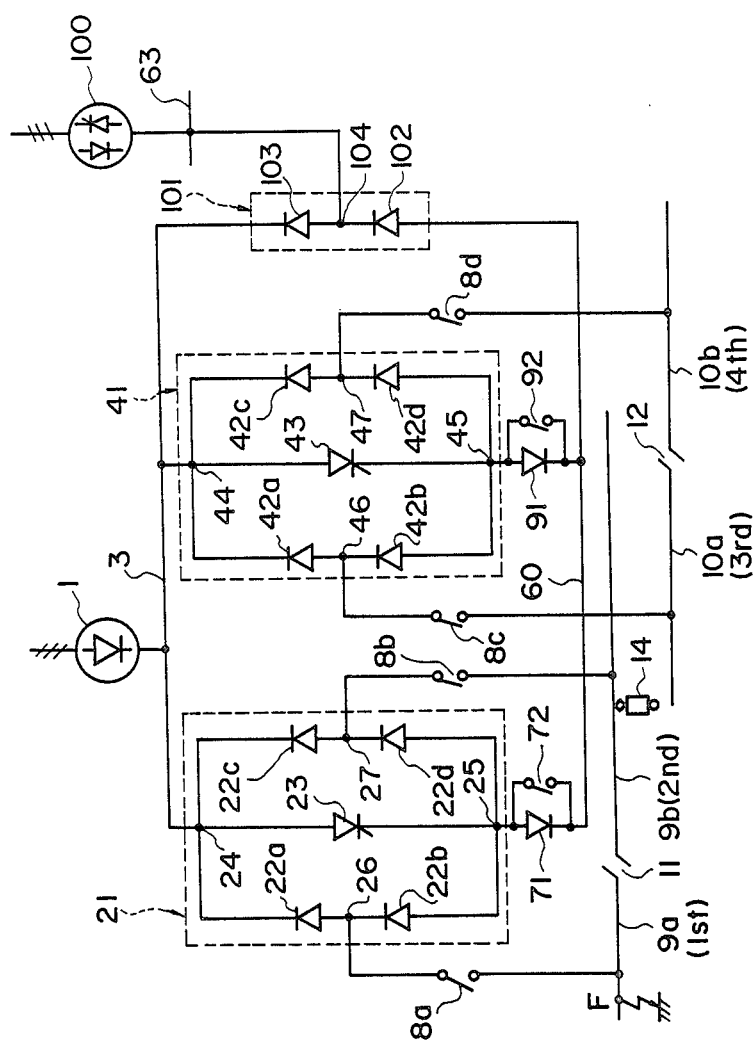
FIG. 4 is a scehmatic block diagram of the third embodiment of the power supply installation for a dc railroad according to the present invention.

FIG. 4 shows a third embodiment of the present invention in which a two-way power converter is connected in place of the power inverter 2 shown in FIG. 3 and a diode series-connected circuit is further provided in order to enhance the reliability of the installation.

In FIG. 4, the reference numeral 101 denotes a diode series-connected circuit including two diodes 102 and 103. The anode of the diode 102 is connected to the cathode of the two stopper diodes 71 and 91 through the mutual spare bus bar 60. The cathode of the diode 103 is connected to the power rectifier 1 through the powering bus bar 3. Further, the regenerative bus bar 63 is connected to a common junction point 104 between the two diodes 102 and 103. A two-way power converter 100 for converting an ac power current to a dc power current or vice versa is connected to the regenerative bus bar 63.

Only the operation of the third embodiment different from that of the second embodiment shown in FIG. 3 will be described hereinbelow.

When the two-way power converter 100 is operated as a spare power rectifier in addition to the power rectifier 1, it is possible to reduce the capacity of the power rectifier 1. Further, in case the power rectifier 1 develops trouble, it is possible to supply a powering current to all the electrtic car power supply lines 9a, 9b, 10a and 10b through the first and second diode bridge-connected circuits 21 and 41 and the first and second thyristor breakers 23 and 43 without suspending the substation.

Further, when the two-way power converter 100 is operated as a power inverter, it is possible to pass a regenerative current to the powering bus bar 3 through the two diodes 102 and 103. Therefore, in case the two-way power converter 100 fails in commutation during power inverter operation, it is possible to prevent the regenerative current from flowing to the side of the two-way power converter 100, that is, to prevent the spread of an accident due to commutation failure of the power inverter 100.

As described above, in the power supply installation for a dc railroad according to the present invention, there exist various advantages as follows:

(a) Since both the powering and regenerative currents can be controlled by only two thyristor breakers 23 and 43, it is possible to economize the number of the thyristors as compared with the prior art installation in which four powering breakers and one regenerative breaker are required. Therefore, the cost of installation can be reduced because the thyristor breaker is very costly, and additionally the operation sequence for maintenance can be simplified.

(b) Since the first and second circuits 21 and 41 are connected through the mutual spare bus bar 60 mutual spare power, even if either one of the two thyristor breakers 23 and 43 develops trouble or is broken down, it is possible to supply a powering current to and restore a regenerative current from all the electric car power supply lines via the non-defective thyristor breaker and the mutual spare bus bar. This operation can enhance the reliability of the power supply installation.

(c) Since a dc disconnecting switch 61 or two stopper diodes 71 and 91 are provided, in case a ground fault accident occurs in an electric car power supply line, it is possible to prevent a powering current from flowing from the non-defective power supply lines to the defective power supply line by opening only the thyristor breaker connected to the defective power supply line. Further, two dc disconnecting switches 72 and 92 are connected in parallel to the two stopper diodes 71 and 91 separately, when these two switches are closed, it is possible to enable the mutual spare power supply system.

(d) When one of a double track is required to suspend the powering current during an extension power supply operation, one of the thyristor breakers 23 and 43 is opened. Therefore, it is possible to continue to supply the powering current to the other of the double track through the other closed thyristor breaker.

(e) In case an accident occurs during an extension powder supply operation, since an extension power supply current supplied from an adjacent substation can be interrupted by the thyristor breaker connected to an accient power supply line, it is unnecessary to interrupt the extension powering current at the adjacent substation. Therefore, it is possible to simplify the operation sequence of repair or maintenance and further to minimize the influence of an accident upon other substations.

(f) Further, in the case of the third embodiment shown in FIG. 4, since a two-way power converter 100 and a diode series-connected circuit 101 are additionally connected and can be operated as a power rectifier, it is possible to reduce the capacity of the power rectifier 1 or to supply a powering current in case the power rectifier 1 develops trouble, without suspending the substation.

Further, when the two-way power converter 100 is operated as a power inverter and fails in commutation, it is possible to interrupt an accident current flowing from the power rectifier 1 to the two-way power converter 100 or to prevent a regenerative current from flowing to the two-way power converter 100. That is, the spread of an accident of the two-way power converter can be prevented.

Further, in case an accident occurs at an electric car power supply line when a powering current is supplied during the mutual spare power supply operation and further the two-way power converter 100 is operating as a power rectifier, it is possible to prevent a powering current from directly flowing from the two-way power converter to a defective power supply line only by opening a thyristor breaker connected to the defective power supply line.

(g) In summary, the features and advantages of the installation according to the present invention is such that in case an accident occurs, it is possible to effectively prevent the spread of an accident and thus enhance the reliability of the system, in spite of the fact that the number of thyristor breakers is reduced into only two.

What is claimed is:

1. An apparatus for use in an electric car power supply system including at least one AC power source, AC-DC converters connected to the AC power source for converting an AC power to a DC power and applying the DC power to a bus bar, the apparatus being connected between the bus bar and at least one pair of DC power supply lines for supplying the DC power to an electric car, the power supply lines being arranged in series and disconnected electrically with a dead section, comprising:

(a) a diode bridge having first, second, third and fourth diodes each having an anode and a cathode, the anode of the first diode being connected at a first junction to the cathode of the second diode, the anode of the third diode being connected at a second junction to the cathode of the fourth diode, the cathode of the first diode being connected at a third junction to the cathode of the third diode, the anode of the second diode being connected at a fourth junction to the anode of the fourth diode, the third junction being connected to the bus bar;

(b) a thyristor having an anode connected to the third junction and a cathode connected to the fourth junction, the thyristor breaking the connection between the third and fourth junctions in response to occurrence of an accident in at least one of the DC power supply lines;

(c) a first switch connected between the first junction and one of the power supply lines; and (d) a second switch connected between the second junction and the other power supply line.

2. An apparatus for use in an electric car power supply system including AC power sources, AC-DC converters connected to the AC power sources for converting an AC power to a DC power and applying the DC power to a bus bar, the apparatus being connected between the bus bar and first and second pairs of power supply lines for supplying the DC power to an electric car, the power supply lines of each of the first and second pairs being arranged in series and disconnected electrically with a dead section, comprising:

(a) a first diode bridge having first, second, third and fourth diodes each having an anode and a cathode, the anode of the first diode being connected at a first junction to the cathode of the second diode, the anode of the third diode being connected at a second junction to the cathode of the fourth diode, the cathode of the first diode being connected at a third junction to the cathode of the third diode, the anode of the second diode being connected at a fourth junction to the anode of the fourth diode, the third junction being connected to the bus bar;

(b) a first thyristor having an anode connected to the first junction and a cathode connected to the fourth junction, the first thyristor breaking the connection between the third and fourth junctions in response to occurrence of an accident in at least one of the power supply lines of the first pair;

(c) a first switch connected between the first junction and one of the power supply lines of the first pair;

(d) a second switch connected between the second junction and the other power supply line of the first pair;

(e) a second diode bridge having fifth, sixth, seventh and eighth diodes each having an anode and a cathode, the anode of the fifth diode being connected at a fifth junction to the cathode of the sixth diode, the anode of the seventh diode being connected at a sixth junction to the cathode of the eighth diode, the cathode of the fifth diode being connected at a seventh junction to the cathode of the seventh diode, the anode of the sixth diode being connected at an eighth junction to the anode of the eighth diode, the seventh junction being connected to the bus bar;

(f) a second thyristor having an anode connected to the seventh junction and a cathode connected to the eighth junction, the second thyristor breaking the connection between the seventh and eighth junctions in response to occurrence of an accident in at least one of the power supply lines of the second pair;

(g) a third switch connected between the fifth junction and one of the power supply lines of the second pair;

(h) a fourth switch connected between the sixth junction and the other power supply line of the second pair; and (i) a fifth switch connected between the fourth junction and the eighth junction.

3. An apparatus for use in an electric car power supply system including AC power sources, AC-DC converters connected to the AC power sources for converting an AC power to a DC power and applying the DC power to a bus bar, a regenerative bus bar and DC-AC converters connected to the regenerative bus bar for converting a DC power to an AC power, the apparatus being connected between the bus bar and first and second pairs of power supply lines for supplying the DC power to an electric car, the power supply lines of each of the first and second pairs being arranged in series and disconnected electrically with a dead section, comprising:

(a) a first diode bridge having first, second, third and fourth diodes each having an anode and a cathode, the anode of the first diode being connected at a first junction to the cathode of the second diode, the anode of the third diode being connected at a second junction to the cathode of the fourth diode, the cathode of the first diode being connected at a third junction to the cathode of the third diode, the anode of the second diode being connected at a fourth junction to the anode of the fourth diode, the third junction being connected to the bus bar;

(b) a first thyristor having an anode connected to the first junction and a cathode connected to the fourth junction, the first thyristor breaking the connection between the third and fourth junctions in response to occurrence of an accident in at least one of the power supply lines of the first pair;

(c) a first switch connected between the first junction and one of the power supply lines of the first pair;

(d) a second switch connected between the second junction and the other power supply line of the first pair;

(e) a first stopper diode having an anode connected to the fourth junction and a cathode connected to the regenerative bus bar;

(f) a third switch connected in parallel with the first stopper diode;

(g) a second diode bridge having fifth, sixth, seventh and eighth diodes each having an anode and a cathode, the anode of the fifth diode being connected at a fifth junction to the cathode of the sixth diode, the anode of the seventh diode being connected at a sixth junction to the cathode of the eighth diode, the cathode of the fifth diode being connected at a seventh junction to the cathode of the seventh diode, the anode of the sixth diode being connected at an eighth junction to the anode of the eighth diode, the seventh junction being connected to the bus bar;

(h) a second thyristor having an anode connected to the seventh junction and a cathode connected to the eighth junction, the second thyristor breaking the connection between the seventh and eighth junctions in response to occurrence of an accident in at least one of the power supply lines of the second pair;

(i) a fourth switch connected between the fifth junction and one of the power supply lines of the second pair;

(j) a fifth switch connected between the sixth junction and the other power supply line of the second pair;

(k) a sixth switch connected between the fourth junction and the eighth junction;

(l) a second stopper diode having an anode connected to the eighth junction and a cathode connected to the regenerative bus bar; and (m) a sixth switch connected in parallel with the second stopper diode.

4. The apparatus as claimed in claim 3, which comprises a ninth diode having an anode connected to the cathodes of the first and second stopper diodes and a cathode connected to the regenerative bus bar and a tenth diode having an anode connected to the cathode of the ninth diode and a cathode connected to the bus bar.

* * * * *